April 22, 1969
W. TRUSKALO
3,440,484
RETRACE PULSE SHAPING IN A TRANSISTOR VERTICAL DEFLECTION CIRCUIT
Filed May 21, 1965

INVENTOR:
WALTER TRUSKALO,
BY William S. Wolfe
HIS ATTORNEY.

INVENTOR:
WALTER TRUSKALO,
BY William S. Wolfe
HIS ATTORNEY.

United States Patent Office 3,440,484

Patented Apr. 22, 1969

3,440,484
RETRACE PULSE SHAPING IN A TRANSISTOR VERTICAL DEFLECTION CIRCUIT

Walter Truskalo, Liverpool, N.Y., assignor to General Electric Company, a corporation of New York Filed May 21, 1965, Ser. No. 457,572
Int. Cl. H01j 29/70
U.S. Cl. 315—27 7 Claims

ABSTRACT OF THE DISCLOSURE

To modify the waveshape of a large induced voltage developed across an inductive output element when a signal is removed therefrom, a voltage dependent resistive element is placed across the inductive output element. The magnitude of the induced voltage initially is decreased but thereafter remains at a higher level for a longer time interval. If an energy storage element, such as a capacitor, is placed in series with the voltage dependent resistive element, the induced voltage attains an almost square waveshape. When used in a transistor deflection circuit of a television receiver wherein the inductive output element comprises a magnetic deflection yoke, this circuit allows shaping the vertical retrace pulse for use as a blanking pulse.

This invention relates generally to a circuit for shaping the retrace pulses in a television receiver and, more particularly, to a retrace pulse shaping circuit for use in a transistor vertical deflection circuit.

In a television receiver a ramp signal is applied to the vertical deflection yoke of the cathode ray tube to vertically scan the electron beam from top to bottom of the viewing screen during the scanning operation. The period of the ramp signal corresponds to the vertical trace period. Upon the completion of each vertical scan, it is necessary to return the electron beam to the top of the screen so that the scanning operation may be repeated. To perform this return, or retrace function, a retrace pulse is utilized. During the retrace period it is necessary that the tube be blanked to prevent distortion of the picture. Such blanking is accomplished by the use of blanking pulses to remove the electron beam from the screen during the desired interval. The blanking pulses have a relatively large magnitude and preferably exhibit a square shape to insure blanking during the complete retrace interval.

Since the retrace pulse occurring at the vertical yoke has a large magnitude, due to the inductive action of the yoke, it is possible and indeed desirable to eliminate extraneous blanking pulses by utilizing the retrace pulse itself as a blanking pulse. However, the retrace pulse after once reaching a high magnitude tends to decay quite rapidly as the energy in the yoke is dissipated. In order to render such a retrace pulse suitable for use as a blanking pulse, it is necessary to maintain the retrace pulse at a large magnitude. The circuit of this invention maintains the retrace pulses at the large magnitude necessary to render such pulses suitable for use as blanking pulses.

Therefore, it is a primary object of this invention to form retrace pulses in a vertical deflection circuit to render such pulses suitable for use as blanking pulses.

Another object of this invention is to maintain a signal at a large magnitude upon cessation of current flow in an inductive element.

Briefly, in one form thereof, the invention involves the use of a voltage dependent resistive element connected across an inductive output load. Upon removal of the signal applied to the inductive element, a large induced voltage is developed across the inductive element. The induced voltage has a polarity which tends to maintain current flow in the inductive output element becomes al- age dependent resistive element across the inductive output element, the initial large magnitude of the pulse is somewhat decreased, but the magnitude is maintained at a much higher level for a much longer period of time. Further improvement of the circuit may be achieved by placing an energy storage device, such as a capacitor, in series with the voltage dependent resistive element. With this arrangement the pulse formed upon cessation of current flow in the inductive output element becomes almost a square pulse with a nearly constant relatively high magnitude. In the transistor deflection circuit of a television receiver, the circuit of the invention provides for shaping the vertical retrace pulse for use as a blanking pulse.

The novel and distinctive features of this invention are set forth in the appended claims. The invention, together with further objects and advantages thereof, may be better understood by reference to the following description and accompanying drawings in which:

Figure 1:
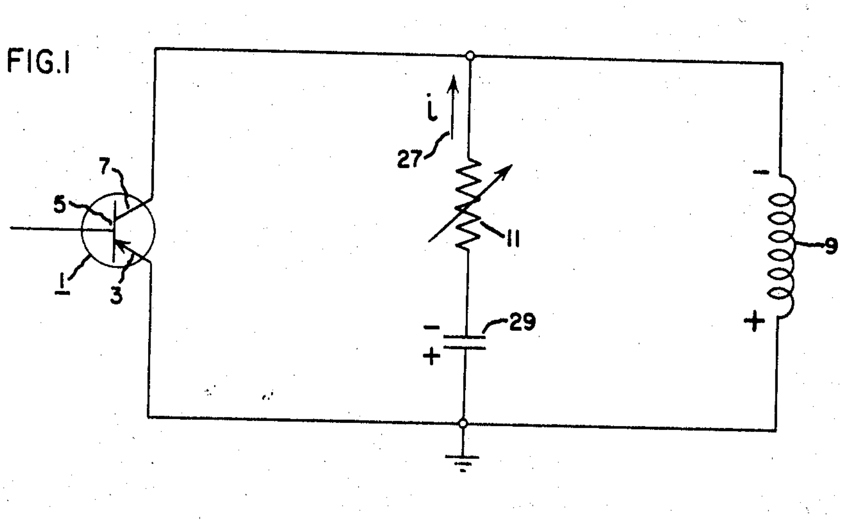
FIGURE 1 is a schematic diagram of a basic circuit in accordance with the invention.

Referring now to FIGURE 1 the basic circuit of the invention is illustrated. A transistor 1 having an emitter 3, a base 5 and a collector 7 supplies a signal to an inductive output element 9. The inductive output element 9 may be any inductive device, but for purposes of this description will be considered to be a magnetic yoke or coil in the vertical deflection circuit of a television receiver. A voltage dependent resistive element 11 is connected across inductive element 9, the resistive element 11 thus being in an electrical path parallel to the electrical path containing inductive output element 9. The voltage dependent resistive element 11 may be any device having a resistance value inversely proportional to the voltage across the element. For purposes of this description element 11 may be considered to be a conventional voltage dependent resistor.

Figure 2:
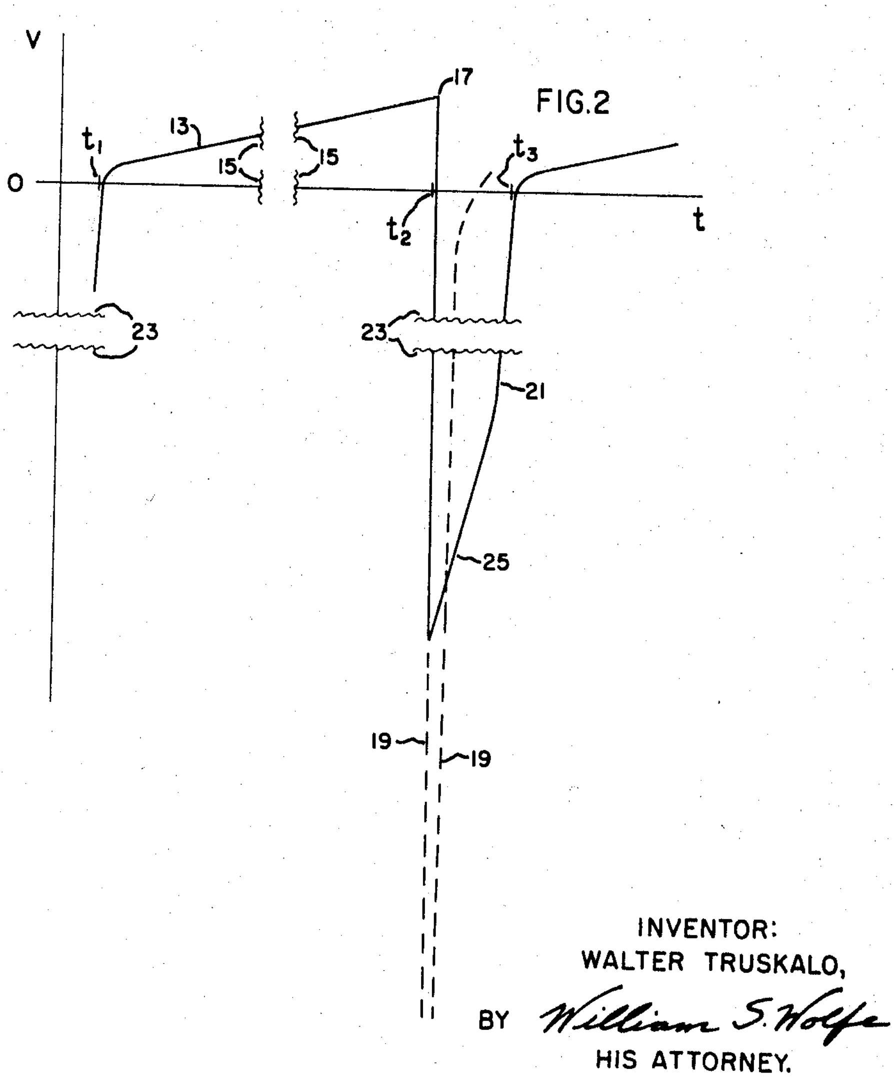
FIGURE 2 is a graph of a signal developed by one embodiment of the invention.

The operation of this basic circuit may best be understood by referring to FIGURE 2. In this figure the voltage V appearing across inductive output element 9 is illustrated as a function of time $t$. From time $t_1$ to $t_2$ the transistor 1 supplies a ramp function voltage 13 to inductive output element 9. As indicated by the interruption in the curve portion 13 by the wavy lines 15, the time duration $t_1$–$t_2$ of the ramp function 13 is much greater relative to a time duration $t_2$–$t_3$ than would appear from the figure. This diagram is not meant to accurately represent the voltage and time values involved in the operation of the circuit, but is merely utilized for purposes of description.

At time $t_2$, or point 17 on the voltage graph, the transistor 1 of FIGURE 1 is shut off and the flow of current to the inductive output element 9 is halted. At this time a voltage having the polarity indicated in FIGURE 1 is induced across the inductive output element 9, as defined by the familiar equation: $Ldi/dt$. In the absence of the voltage dependent resistive element 11 the induced voltage would be a peak of great size and of short duration as indicated by dotted lines 19. However, by utilizing the voltage dependent resistive element 11 a pulse shape 21 with a time duration of $t_2$–$t_3$ may be produced. Again the interruption provided by the wavy lines 23 indicate that the relative magnitude of the pulse 21 with respect to the voltage 17 is greater than that illustrated. It should be noted that the pulse shape 21 is not perfectly square but exhibits some decay from the peak value, as indicated by numeral 25.

The transformation of spike 19 into pulse 21 by the addition of the voltage dependent resistive element 11 results from the additional current path provided by the element 11. As the induced voltage resulting from the interruption of the current flowing in the element 9 rises, the resistance of the voltage dependent resistor 11 decreases so that current having the direction shown by arrow 27 in FIGURE 1 flows through element 11. Since the element 11 has a lower resistance with increased voltage, the initial high voltage produces a correspondingly very low resistance value for element 11 and a relatively high current passes therethrough. The current passing through element 11 has a direction which tends to sustain the original current flow in the inductive element 9. The current flowing through element 11 tends to limit the initial high value of induced voltage produced across element 9 when the transistor 1 is turned off by reducing the change in current in element 9 so that the *Ldi/dt* voltage is decreased. The decrease of the induced voltage in turn produces a resultant increase in the resistance of the voltage dependent element 11 so that the current flowing through the element 11 tends to be decreased. The increased resistance increases the rate of current decay in element 9 and accordingly increases the voltage induced across the element 9.

The change in the resistance value of the voltage dependent resistor 11 has a tendency to produce a constant rate of current decay in element 9 and, therefore, to produce a wider induced voltage pulse. In an actual circuit, however, the energy stored in the inductive element 9 tends to be dissipated. When this occurs the rate of current decay in element 9 actually has to be increased to maintain the same voltage. With such a circuit the only way to increase the current decay is to decrease the voltage across element 11, but this only partially corrects the problem and the result is the decay portion 25 shown in FIGURE 2.

Figure 3:
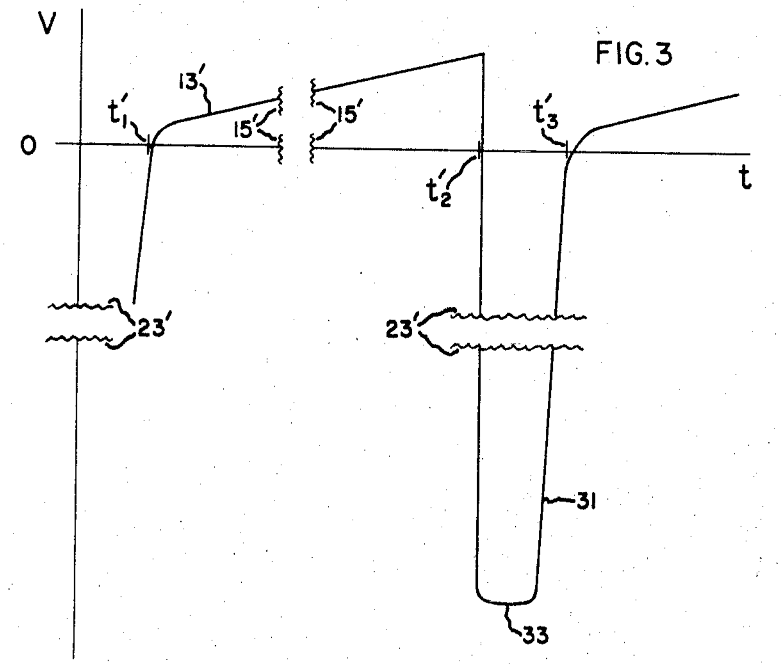
FIGURE 3 is a graph of the signal formed by a preferred embodiment of the invention.

To improve the shape of the retrace pulse obtained by placing the voltage dependent resistive element 11 across the inductive output element 9, an energy storage device, such as a capacitor 29, may be placed in series with the element 11. With capacitor 29 in series with the voltage dependent resistive element 11, the resultant retrace pulse closely approximates the ideal shown in FIGURE 3. In this figure those elements which are similar to the elements of FIGURE 2 have been given primal reference numerals. In FIGURE 3 it will be noticed that the pulse shape 31 is nearly square and that a nearly constant maximum value 33 replaces the decay portion 25 of pulse 21 in FIGURE 2.

The improved result achieved by placing capacitor 29 in series with the voltage dependent resistive element 11 results from the fact that the voltage across and thus the resistance of the element 11 is decreased without a corresponding decrease in the *Ldi/dt* voltage across the inductive element 9. This result obtains due to the charging of the capacitor 29 with the polarity shown in FIGURE 1.

The initial inrush of current through capacitor 29 and voltage dependent resistive element 11, caused by shutting off transistor 1, still serves to limit the peak of the spike indicated by dotted lines 19 in FIGURE 2. However, as capacitor 29 charges the voltage between the negative end of inductive element 9 and the negative plate of capacitor 29 is decreased, even though the voltage across the inductive element 9 remains constant. The decrease in voltage between the negative end of element 9 and the negative plate of capacitor 29 means that the voltage across element 11 is decreased, thereby causing the resistance of element 11 to increase and accordingly increasing the RC time constant of the circuit comprising element 11 and capacitor 29. The increased resistance of element 11 causes the charging current flowing in the direction indicated by arrow 27 to decrease which thereby causes the rate of decay of the current in the inductive element 9 to increase. By choosing proper values of resistive element 11 and capacitor 29 the rate of current decay in the inductive element 9 may be held at a relatively constant value so that the *Ldi/dt* voltage remains constant. The problem encountered in the basic circuit upon dissipation of energy in the inductive element 9 is overcome by constantly decreasing the voltage across the element 11 by the action of capacitor 29. Charging of capacitor 29 continuously decreases the voltage across resistive element 11 to thereby provide the increased resistance (decreased current flow) necessary to cancel the effects of energy dissipation without decreasing the square top 33 of pulse 31 in FIGURE 3.

An additional benefit realized through the use of the voltage dependent resistance element 11 and capacitor 29 of FIGURE 1 is the protection of the transistor 1 from collector to emitter voltages in excess of the breakdown voltage ratings. Thus, a retrace pulse 19 as shown in FIGURE 2 would require the use of a transistor having a much higher breakdown voltage rating than is required where the retrace pulse is shaped in accordance with the invention.

Figure 4:
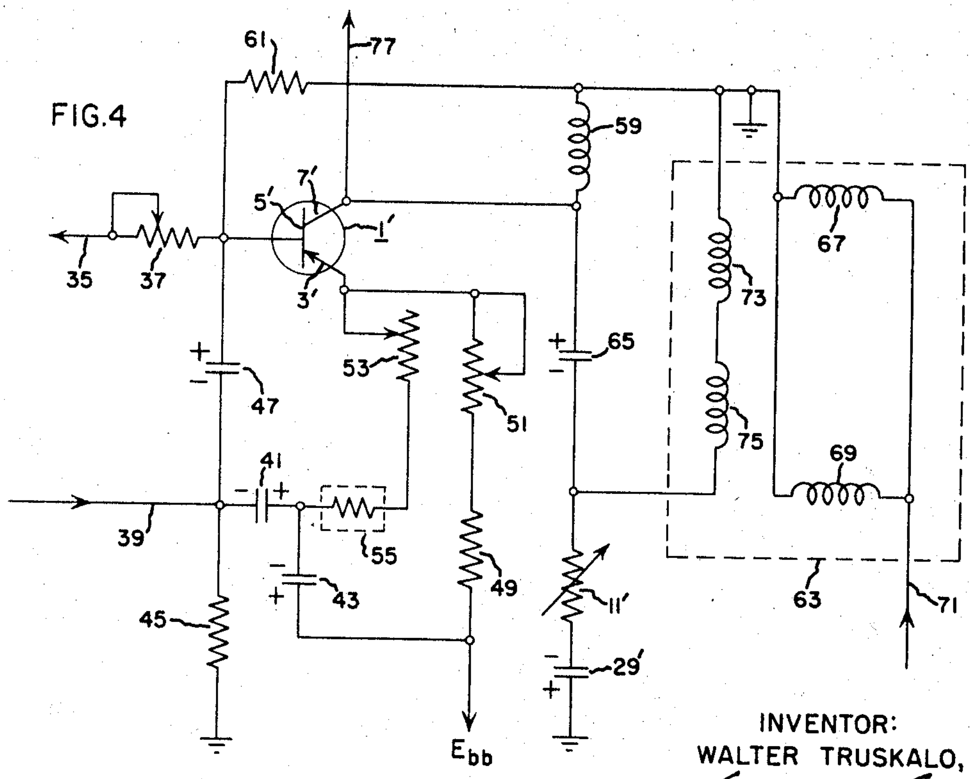
FIGURE 4 is a schematic diagram of the vertical deflection circuit of a television receiver employing the circuit of the invention.

The basic circuit of the invention shown in FIGURE 1 is especially suitable for use in a transistorized vertical deflection stage of a television receiver as depicted in FIGURE 4. In the circuit of FIGURE 4 the transistor 1 of FIGURE 1 is a vertical output transistor 1′ having emitter 3′, base 5′ and collector 7′ electrodes. A bias is applied to base 5′ through lead 35 and a vertical bias potentiometer 37 in conventional fashion.

The signal developed by a conventional vertical oscillator (not shown) is coupled via line 39 to the serial combination of capacitors 41 and 43 which serve to integrate the vertical oscillator signal, the integrated signal appearing across a resistor 45 and a capacitor 47 being employed to couple the integrated signal to the base 5′ of transistor 1′.

An operating voltage is applied to the emitter 3′ through a resistor 49 and a vertical height adjusting potentiometer 51. The signal appearing at the emitter 3′ of transistor 1′ is integrated by a potentiometer 53, a thermistor 55 and capacitor 43. The integrated emitter signal is added to the integrated vertical oscillator signal and is coupled back to the base 5′ through coupling capaictor 47. The integrated emitter signal is applied to base 5′ in this manner to control linearity in order to produce the necessary ramp wave shape. The potentiometer 53 serves as a linearity control by providing control of the integration of the emitter signal while the transistor 55 compensates for linearity variations which might result due to temperature variations.

A choke 59 is connected from collector 7′ of transistor 1′ to ground, the base 5′ of transistor 1′ also being connected to ground through a resistor 61.

The output of transistor 1′ is connected to deflection yoke 63 through a coupling capacitor 65. The deflection yoke 63 includes horizontal deflection coils or yokes 67 and 69 which are energized from the horizontal deflection circuit via line 71. The deflection yoke 63 also includes the vertical deflection coils or yokes 73 and 75, which correspond to the inductive output element 9 in FIGURE 1. Connected in parallel with a first path containing vertical deflection elements 73 and 75, is a second path including a voltage dependent resistor 11′ and a capacitor 29′, corresponding to element 11 and capacitor 29 in FIGURE 1.

In operation, the transistor 1′ is switched on to couple a ramp function through coupling capacitor 65 to vertical deflection yokes 73 and 75 from time $t_1$ to time $t_2$ as explained in connection with FIGURE 2. Transistor 1′ is then switched off from time $t_2$ to time $t_3$, after which time the transistor is switched back on to again provide the ramp function. As explained in connection with FIG- URE 1 and FIGURE 3 the deflection yokes 73 and 75 and the voltage dependent resistor 11' and capacitor 29' provide a retrace pulse having the shape of pulse 31 in FIGURE 3. This retrace pulse is fed to the video amplifier circuit through coupling capacitors 65 and line 77 to provide a blanking pulse during the retrace time.

In one particularly successful embodiment as employed in the circuit of FIGURE 4 the folloing circuit values were employed:

Voltage dependent resistive element 11'—Type 432BNR-60, (manufactured by the Carborundum Co.), having a rating of 6 volts at 1 ma. and exhibiting a resistance characteristic as defined by the ratio of the voltage at 1 ma. to the voltage at 0.1 ma. of 2.85.
Capacitor 29'—5μf
Yokes 73 and 75:
Total inductance—72 mh.
Total resistance—40 ohms It should be realized that this description has been made with respect to one specific embodiment but that the invention is not limited to this embodiment or the particular use as described. It will be appreciated that modifications and changes may be made by those skilled in the art without departing from the spirit and scope of the invention. Therefore, it is not desired to limit this invention to the particular illustrations shown, but to cover all modifications and changes within its spirit and scope by the appended claims.

What I claim as new and desire to secure by Letters Patent of the United States is:

1. A pulse shaping circuit comprising:
(a) an inductive output element in a first path,
(b) a voltage dependent resistive element connected in parallel with said inductive output element, and
(c) a semiconductor switching means for removing an input signal from said output element and said voltage dependent resistive element, whereby the width of a pulse produced by discharge through said output element and said voltage dependent resistive element is increased.

2. A pulse shaping circuit comprising:
(a) an inductive output element in a first path,
(b) an energy storage means,
(c) a voltage dependent resistive element connected in series with said energy storage means to form a series combination in a second path, said series combination being connected across said inductive output element, and
(d) a semiconductor switching means for removing an input signal from said first and second paths, whereby the width of a pulse produced by discharge through said output element and said voltage dependent resistive element is increased.

3. In a transistor vertical deflection circuit for a television receiver, a retrace pulse shaping circuit comprising:
(a) a vertical deflection coil in a first path,
(b) a voltage dependent resistive element connected in parallel with said vertical deflection coil, and
(c) a semicondctor switching means for removing an input signal from said deflection coil and said voltage dependent resistive element, whereby the width of the pulse produced by discharge through said vertical deflection coil and said voltage dependent resistive element is increased.

4. A retrace pulse shaping circuit as recited in claim 3 wherein said voltage dependent resistive element is a voltage dependent resistor having a value of resistance inversely proportional to the voltage across said resistor.

5. In a transistor vertical deflection circuit for a television receiver, a retrace pulse shaping circuit comprising:
(a) a vertical deflection coil in a first path,
(b) an energy storage means,
(c) a voltage dependent resistive element connected in series with said energy storage means to form a series combination in a second path, said series combination being connected in parallel with said vertical deflection coil, and
(d) a semiconductor switching means for removing an input signal from said first and second paths, the rated resistance of said voltage dependent resistive element being low enough so that the width of a pulse produced by discharge through said vertical deflection coil and said voltage dependent resistive element is increased.

6. A retrace pulse shaping circuit as recited in claim 5 wherein said energy storage means comprises a capacitor.

7. A retrace pulse shaping circuit as recited in claim 5 wherein said voltage dependent resistive element is a voltage dependent resistor having a value of resistance inversely proportional to the voltage across said resistor.

References Cited

UNITED STATES PATENTS

| | | | |
|---|---|---|---|
| 3,061,757 | 10/1962 | Janssen et al. | 315—27 |
| 3,165,666 | 1/1965 | Rickling | 315—27 |
| 3,343,006 | 9/1967 | Attwood | 315—27 X |

OTHER REFERENCES

Rickling: Vertical Deflection Compensation, RCA Technical Notes, January 1965, pp. 1–2.

RODNEY D. BENNETT, Jr., *Primary Examiner.*

B. L. RIBANDO, *Assistant Examiner.*